(12) United States Patent
Li et al.

(10) Patent No.: US 10,176,796 B2
(45) Date of Patent: Jan. 8, 2019

(54) VOICE PERSONALIZATION FOR MACHINE READING

(71) Applicant: Intel Corporation, Santa Clara, CA (US)

(72) Inventors: Honggang Li, Beijing (CN); Yuan Zhu, Beijing (CN); Bo Huang, Beijing (CN); Liu Yang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 638 days.

(21) Appl. No.: 14/369,443

(22) PCT Filed: Dec. 12, 2013

(86) PCT No.: PCT/CN2013/089236
§ 371 (c)(1),
(2) Date: Jun. 27, 2014

(87) PCT Pub. No.: WO2015/085542
PCT Pub. Date: Jun. 18, 2015

(65) Prior Publication Data
US 2016/0284340 A1    Sep. 29, 2016

(51) Int. Cl.
*G10L 13/10* (2013.01)
*G10L 13/033* (2013.01)
*G09B 21/00* (2006.01)
*G06F 3/16* (2006.01)
*H04L 29/06* (2006.01)

(52) U.S. Cl.
CPC ............ *G10L 13/033* (2013.01); *G06F 3/165* (2013.01); *G09B 21/006* (2013.01); *G10L 13/10* (2013.01); *H04L 63/10* (2013.01)

(58) Field of Classification Search
CPC ....... G10L 13/06; G10L 13/033; G10L 13/10; H04L 63/10; G06F 3/165; G09B 21/006
USPC ........................................................ 704/260
See application file for complete search history.

(56) References Cited

U.S. PATENT DOCUMENTS 6,510,415 B1 *  1/2003  Talmor ............... G07C 9/00158
                                                      704/246
8,332,275 B2 * 12/2012  Poon ................... G06Q 30/0613
                                                      370/395.1

(Continued)

FOREIGN PATENT DOCUMENTS

CN      101521853 A     9/2009
CN      102117614 A     7/2011

(Continued)

OTHER PUBLICATIONS

"International Application Serial No. PCT/CN2013/089236, International Search Report dated Sep. 1, 2014".

(Continued)

*Primary Examiner* — Bharatkumar S Shah
(74) *Attorney, Agent, or Firm* — Schwegman Lundberg & Woessner, P.A.

(57) ABSTRACT

Systems and techniques of voice personalization for machine reading are described herein. A message with textual content may be received. A sender of the message may be identified. A voice model that corresponds to the sender may be identified. An audio representation of the textual content may be rendered using the voice model.

19 Claims, 5 Drawing Sheets

(56) References Cited

U.S. PATENT DOCUMENTS

| | | | |
|---|---|---|---|
| 8,934,652 B2* | 1/2015 | Lord .................... | G09B 21/006 |
| | | | 381/312 |
| 2008/0235024 A1* | 9/2008 | Goldberg .............. | G10L 13/033 |
| | | | 704/260 |
| 2010/0153116 A1* | 6/2010 | Szalai .................... | G10L 13/00 |
| | | | 704/260 |
| 2012/0069131 A1* | 3/2012 | Abelow ................ | G06Q 10/067 |
| | | | 348/14.01 |
| 2013/0282375 A1* | 10/2013 | Henry, Jr. ........... | H04L 12/5895 |
| | | | 704/260 |
| 2014/0019135 A1* | 1/2014 | Talwar .................. | G10L 13/033 |
| | | | 704/260 |

FOREIGN PATENT DOCUMENTS

| | | |
|---|---|---|
| CN | 102568472 A | 7/2012 |
| CN | 103065620 A | 4/2013 |

OTHER PUBLICATIONS

"International Application Serial No. PCT/CN2013/089236, Written Opinion dated Sep. 1, 2014".

* cited by examiner

VOICE PERSONALIZATION FOR MACHINE READING

This application is a U.S. National Stage Application under 35 U.S.C. 371 from International Application No. PCT/CN2013/089236, filed Dec. 12, 2013, which is hereby incorporated by reference in its entirety.

TECHNICAL FIELD

Embodiments described herein generally relate to audible machine reading and more specifically to voice personalization for machine reading.

BACKGROUND

Machine reading of textual content has been used in a variety of circumstances. For example, machine reading may be used to allow the visually impaired to access textual content. Other examples may include reading textual content in situations where distraction is an issue, such as reading a text message to an automobile driver. Generally, machine reading is performed by a generic voice model. In some examples, the voice model may model a male or female voice.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Although machine reading may be useful in a variety of situations, it may also be impersonal or become dull because the reading is usually limited to a small set of voices available on the user's device. To combat these problems, and possibly foment greater intimacy between writer and reader, a personalized (e.g., custom) voice model may be used. Such a personalized voice model may allow the reading of a variety of textual content to a user in a sender's voice. This approach benefits from the flexibility of a voice model over dictation—such as when an author reads her own works—by providing a single input by the author that may then be used for multiple written communications. Thus, a friend's text messages may be read in the friend's voice with a relatively small initial effort on the friend's part. Similarly, a politician's campaign literature may be read in the politician's own voice, or a book may be read in the author's voice.

In an example, the sender (e.g., author, creator, distributor, etc.) of the textual content may dictate the voice model to be used. In an example, the user playing (e.g., having the textual content read by the machine) the textual content may dictate the voice model to be used. In either case, the textual content may identify the sender, such that the decision may be made. In an example, to prevent unauthorized use of the voice model, an authorization may occur to verify that the user has permission to use a given voice model. In an example, the permission for use of the voice model may be contingent on the textual content. Thus, a friend may limit use of his voice model to short message service (SMS) text messages and prevent the voice model's use in reading web pages.

Allowing the use of custom voice models allows users the benefits of written communication in situations where reading is impractical while also providing for a greater connection between the user and the author. Providing an authorization model allows author's peace of mind that their voice will not be abused. Thus, voice personalization for machine reading can enhance a user's experience with machine reading technology in a safe and practical manner.

Figure 1:
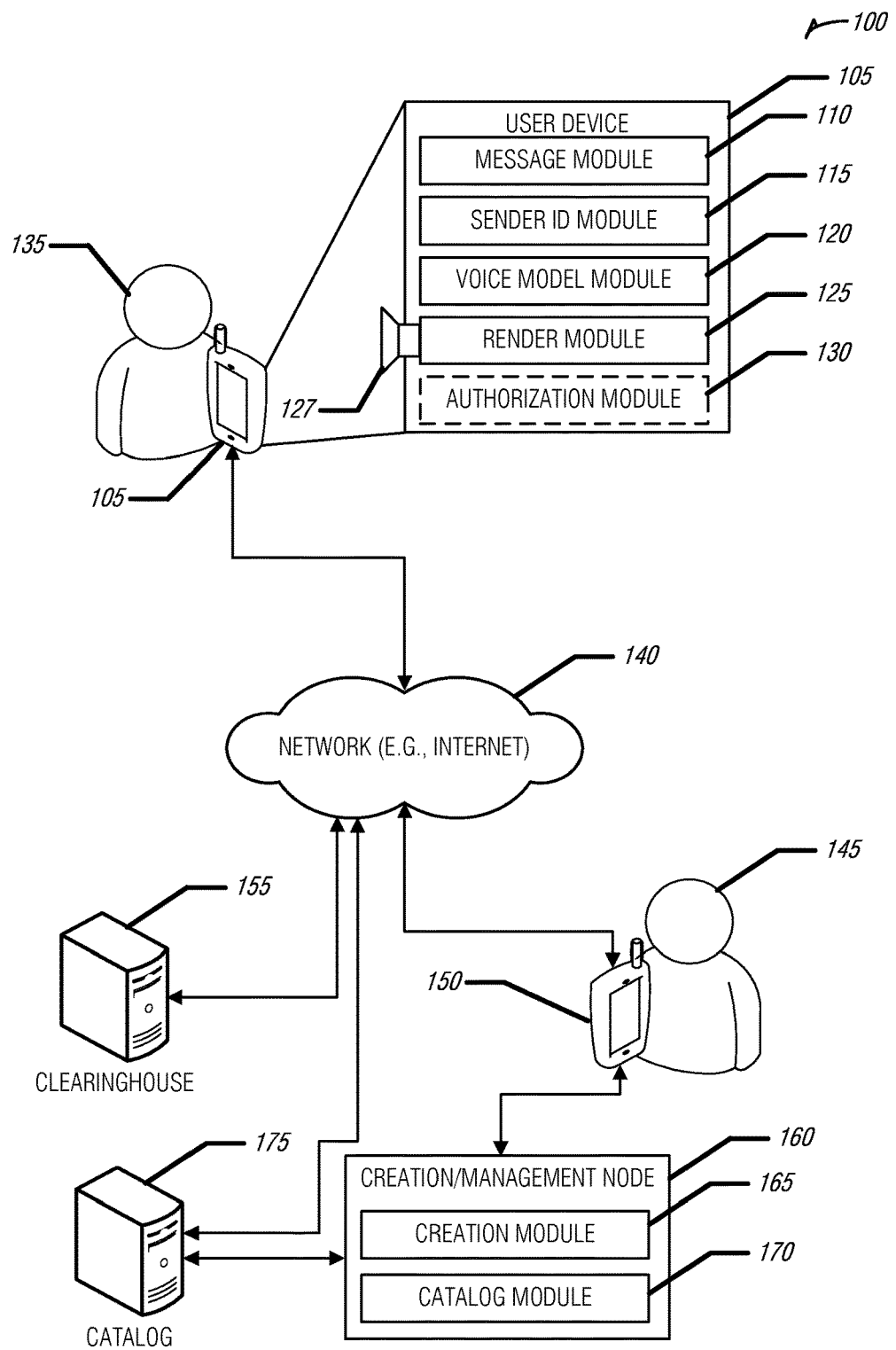
FIG. 1 is a block diagram of an example of a system of voice personalization for machine reading, according to an embodiment.

FIG. 1 is a block diagram of an example of a system 100 of voice personalization for machine reading. The system 100 may include a user device 105 that may be operated by a user 135. The user device 105 may include a message module 110, a sender identification (ID) module 115, a voice model module 120, a render module 125 (that may be operably connected to a speaker 127), and an authorization module 130. In an example, the system 100 may also include one or more of an authorization clearinghouse 155, a voice model catalog 175, and a voice model creation/management node 160.

The message module 110 may be arranged to receive (or receive) a message with textual content. A message may include any type of media with textual content, such as a publication. Thus, the message may include books, magazines, articles, web pages, etc. Textual content is content that can be rendered in glyphs for reading by a human. In an example, a personal message is a type of message. A personal message is a communication from an authoring entity—referred to herein as a sender 145 whether it is an individual or organization creating or distributing the work—to one or more recipients (e.g., user 135). In this example, the message is directed toward the recipient(s) and thus is not a general publication. Examples of such messages may include text messages (e.g., SMS messages, instant messages, chats, etc.), emails, private forum postings, etc.

In an example, receiving the message entails receiving an electronic document including the message. In this example, the message is a discrete and identifiable portion of the electronic document. Examples of such messages may include a web page (e.g., received when accessed) with multiple postings (e.g., forum postings, comments, etc.). Each posting may be the message. Another example may include an electronic magazine or newspaper in which each article may be the message. Thus, the received media with the textual content may be a discrete message (as described above) or it may contain a discrete message.

The sender ID module 115 may be arranged to identify the sender 145 of the message. Such identification may come from the message itself, such as the "from" field in an email, sender identification on an instant message, posting or article byline, book author, etc. In an example, the identification may be made via the context in which the message was received. For example, a messaging thread in which bidirectional communication is established prior to sending messages and individual messages are not tagged with the sender 145. In an example, a third party may be contacted in order to identify the sender 145. For example, the message may contain a sender key which may be used to lookup the sender 145 if the user has access to the service.

The voice model module 120 may be arranged to identify a voice model corresponding to the sender 145, for example, from a plurality of voice models from a plurality of senders. In an example, the identification locates a voice model represented to be from the sender 145. In an example, this may be accomplished by using the sender ID to lookup the voice model from, for example, a catalog module 170 that may reside on the user device 105, the sender device 150, or a network 140 accessible catalog server 175. In an example, the catalog module 170 may be included in the voice model or voice model module 120. In an example, the identification correlates the sender 145 to a voice model, though the voice model does not represent the sender 145. For example, the user 135 may have licensed a celebrity voice model for reading text messages. The user 135 may configure the voice model module 120 to use the celebrity voice when her spouse texts.

The render module 125 may be arranged to render an audio representation of the textual content using the voice model. Such rendering includes the application of the voice model to the textual content to produce sound signals that may be emitted from a speaker as speech. This may be accomplished, for example, by performing a linguistic analysis of the text to determine phrasing, intonation, and duration of sounds in the text to produce an utterance composed of phonemes taken from the voice model. However, any procedure by which the text may be converted to speech in accordance with a particular voice model may be used.

As noted above, the system 100 may also include an authorization module 130. The authorization module may be arranged to receive authorization to use the voice model. Such authorization may prevent the improper or illicit use of a voice model. For example, an individual may wish others to hear his texts in his own voice, but may want to prevent the use of his voice for making threatening phone calls. This is accomplished by providing authorization to others to use the voice model and also providing restrictions on the use of the voice model.

In an example, receiving authorization may include acquiring the authorization from the message (e.g., the authorization is embedded in the message). For example, a voice model copy may be included in the message. In another example, a key may be included in the message and designed to permit both the downloading of the voice model (e.g., if the voice model is not already present on the user device 105) and use of the voice model. In an example, the authorization may be obtained from a clearinghouse 155. Thus, the embedded key may be presented to the clearinghouse 155 which may, in turn, provide a key to decrypt the voice model for use by the user device 105. An example scenario of embedded message authorization is described below with respect to FIG. 3.

In an example, the authorization may be received as part of an authorization session. For example, the authorization module 130 may establish an authorization session during which the voice model may be used. In an example, the authorization session may provide a single authorization for a set of messages. In these examples, the individual message need not carry authorization information, beyond, perhaps, sender ID or content identification. In an example, the messages may include a session ID. The session ID of the messages may be matched (e.g., a correspondence may be made) to the session in order to determine authorization. In an example, scenario of embedded message authorization is described below with respect to FIG. 4.

In an example, the set of messages may include messages received during a window of time (e.g., five seconds, two days, etc.). In an example, the set of messages has a predetermined cardinality. For examples, the authorization may be good for five messages. In an example, the set of messages may include a specific type of message. Message type may be determined by its intrinsic characteristics (e.g., an email vs. and instant message) or by an application arranged to handle such messages (e.g., an email reader vs. a web browser). In an example, any combination of time, set cardinality, or message type may be used to determine messages that are part of the set of messages.

In either the individual authorization or session authorization mechanisms described above, the authorization itself may come in many forms. In an example, a standard digital rights management (DRM) scheme may be applied to the voice model. The DRM scheme may be modified to address the alternative uses a voice model may have over, for example, an audio book, music, or a video. In an example, the authorization may include a digital certificate. In an example, the authorization may include one or restrictions on voice model use, such as who may use the voice model, how long they may use it, how many times they may use it, what times of day it may be used, on what content it may be used, and on what types of content it may be used. Further, the authorization may include a reporting of use, to, for example, the clearinghouse 155. By reporting such use, unseen or unavoidable malfeasance may be remedied. For example, if a threatening call were made to a politician, and the reported use of the voice model corresponds to that call, the sender 145 may be exonerated. In an example, the voice model may be modified or rendered in such a way that an audio signature is embedded in the rendered audio representation to designate the source of the use, or simply that it is a manufactured voice. For example, a high or low frequency code, or an unobtrusive inclusion of noise across the frequency spectrum (e.g., to defeat high or low pass filtering) may be added to the rendered audio representation.

In an example, identifying the sender 145 (e.g., by the sender ID module 115) may include the use of the authorization module 130. As discussed above, the identification of the sender 145 may include a sender key that is used to lookup the sender 145. During this lookup procedure, the authorization module 130 may authenticate itself to the sender repository. In an example, no initial authentication is necessary, however, the authorization module 130 may receive authorization comprising a set of use conditions during the lookup. In an example, identifying the voice model (e.g., by the voice model module 120) may include using the authorization module 130 in a similar fashion as that described with respect to the sender identification. In an example, the authorization module performs an authorization request prior to receiving the authorization. In an example, the authorization is received without prior, explicit, request by the authorization module 130, or even the user device 105.

In an example, rendering the audio representation (e.g., by the rendering module 125) includes verifying that the voice model is authorized and not use the voice model otherwise. In an example, the authorization module 130 performs the authorization and controls the render module 125, preventing the rendering of the audio representation without authorization. In an example, the render module 125 is in control, communicates with the authorization module 130, and determines whether the voice model is authorized. In any case, the rendering of the audio representation may be prevented if the voice model is not authorized to the user device 105. In an example, the use of the voice model is also authorized. For example, the use may be restricted to particular content (e.g., a specific email), to a type of content (e.g., email vs. internet postings), a geographic location, or a time period (e.g., one week, weekends, holidays, etc.).

In an example, the system 100 may include facilities to create or management voice models for the sender 145. In an example, the system 100 may include a creation module 165 and a catalog module 170. As illustrated in FIG. 1, each of these modules may reside on a creation/management node 160. The creation/management node 160 may reside, in whole or in part, on the sender device 150, or remote from the sender device 150.

The creation module 165 may include a user interface, or an interface to interact with a user interface (e.g., a web service) to interact with the sender 145 to create a voice model. For example, the creation module 165 may present, or cause the presentation of, a script to the sender 145. As used herein, "script" refers to textual content to be read by a human (as opposed to the concept of a script in computer programming). The script may be arranged to elicit phonemes from the sender 145 to be used in voice synthesis (e.g., as described above). The creation module 165 may capture voice samples from the sender (e.g., in response to the script). These voice samples may be correlated to portions of the script to, for example, create the phonemes. In an example, the voice model may be trained from a predefined, or previously created, model. Such training may include the use of neural networks, expert systems, or other artificial intelligence based mechanisms.

The catalog module 170 may be arranged to store the voice model (e.g., as created by the creation module 165). Such storage may be local to the sender device 150 or remote thereof. In an example, the catalog module 170 is arranged to store the created voice model in a network 140 accessible location, such as on the catalog server 175. However, such network 140 accessibility may also be achieved in a peer-to-peer manner directly from the sender device 150 to the user device 105. For example, the catalog may be a local service to the sender device 150 that is advertised when a peer-to-peer connection is formed between the two devices.

As described above, voice personalization for machine reading allows greater personalization of machine read content. The content may be personalized such that a friend's emails are read in the friend's own voice. Further, the personalization may allow a book author's own voice to read her works without the time and expense of separately recording readings of each work. To combat the improper use of one's voice model, the described system may also include an authorization mechanism that gives senders greater control over when and how their own voice is used.

Figure 2:
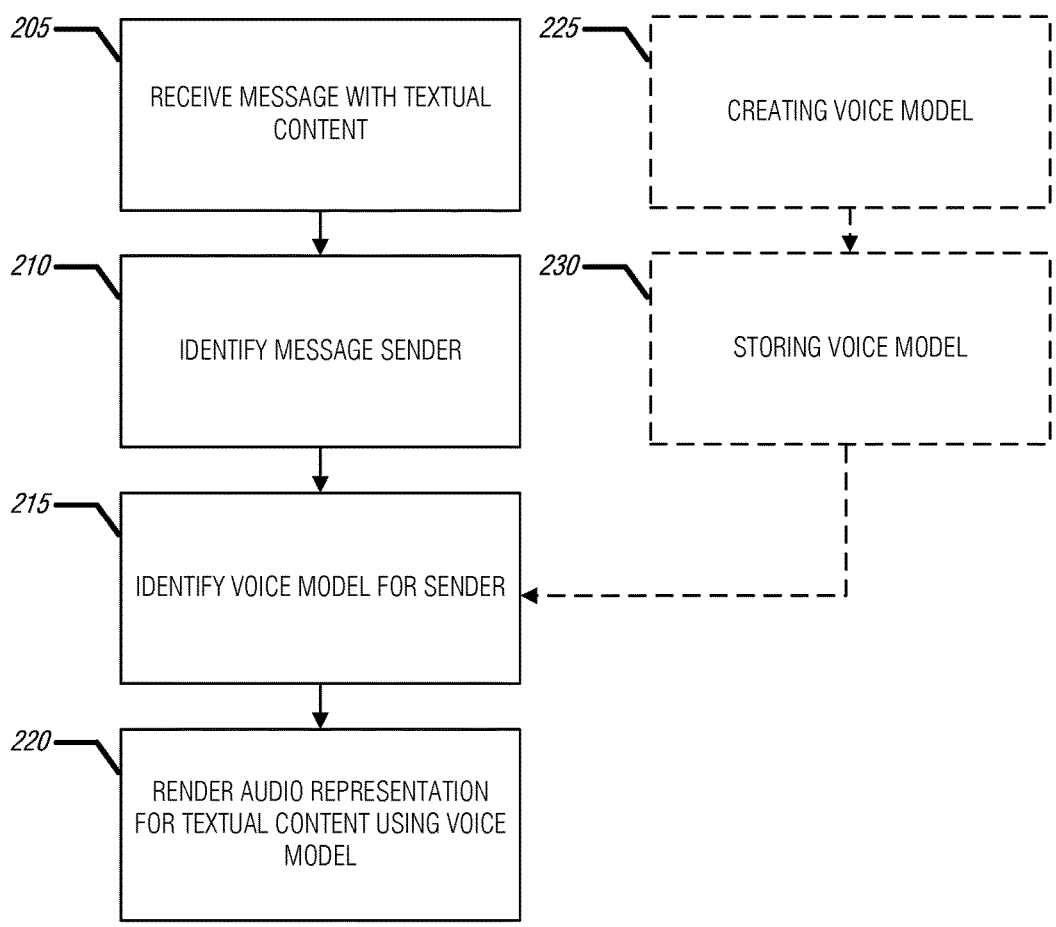
FIG. 2 illustrates a flow diagram of an example of a method of voice personalization for machine reading, according to an embodiment.

FIG. 2 illustrates a flow diagram of an example of a method 200 of voice personalization for machine reading. The operations of the method 200 may be performed by any number of machine components, including any or all of those described above with respect to FIG. 1.

At operation 205, a message with textual content may be received (e.g., at a user's device). In an example, the message may be an SMS message. In an example, the message may be an instant message. In an example, the message may be an email. In an example, receiving the message may include receiving an electronic document including the message. In an example, the electronic document is a webpage. In an example, the message is a discrete and identifiable portion of the electronic document that corresponds to the sender. In an example, the message is a posting on a web page.

At operation 210, a sender of the message may be identified. Additional details of this operation are described above with respect to FIG. 1.

At operation 215, a voice model corresponding to the sender may be identified. Additional details of this operation are described above with respect to FIG. 1.

At operation 220, an audio representation of the textual content may be rendered using the voice model. In an example, rendering the audio representation may include verifying that the voice model is authorized and not using the voice model otherwise.

In an example, at least one of identifying the sender or identifying the voice model includes receiving authorization to use the voice model. In an example, receiving authorization to use the voice model may include acquiring the authorization from the message, the authorization being embedded in the message. In an example, receiving authorization to use the voice model may include acquiring the authorization from a clearing house. In an example, the authorization may be provided via a digital rights management service. In an example, the authorization may include a digital certificate.

In an example, receiving authorization may include establishing an authorization session, the authorization session providing authorization for a set of messages, the set of messages including the message. In an example, the set of messages may include any messages received from the sender during a window of time. In an example, the set of messages may have a predetermined cardinality. In an example, the message may include a session identification that corresponds to the session. In an example, verifying the authorization may include matching the session identification to the session.

At operation 225, a voice model may be created. In an example, creating the voice model may include presenting a script to a user. Voice samples from the user (e.g., while reading the script) may be captured. The voice samples may then be correlated to portions of the script. As described above, the script may be arranged to elicit phonemes from the user and the voice samples correspond to those phonemes.

At operation 230, the created voice model may be stored. In an example, the voice model is stored locally, on the user's device. In an example, the voice model is stored remotely, such as at a third-party provider. In an example, the voice model is stored in a network accessible location.

Figure 3:
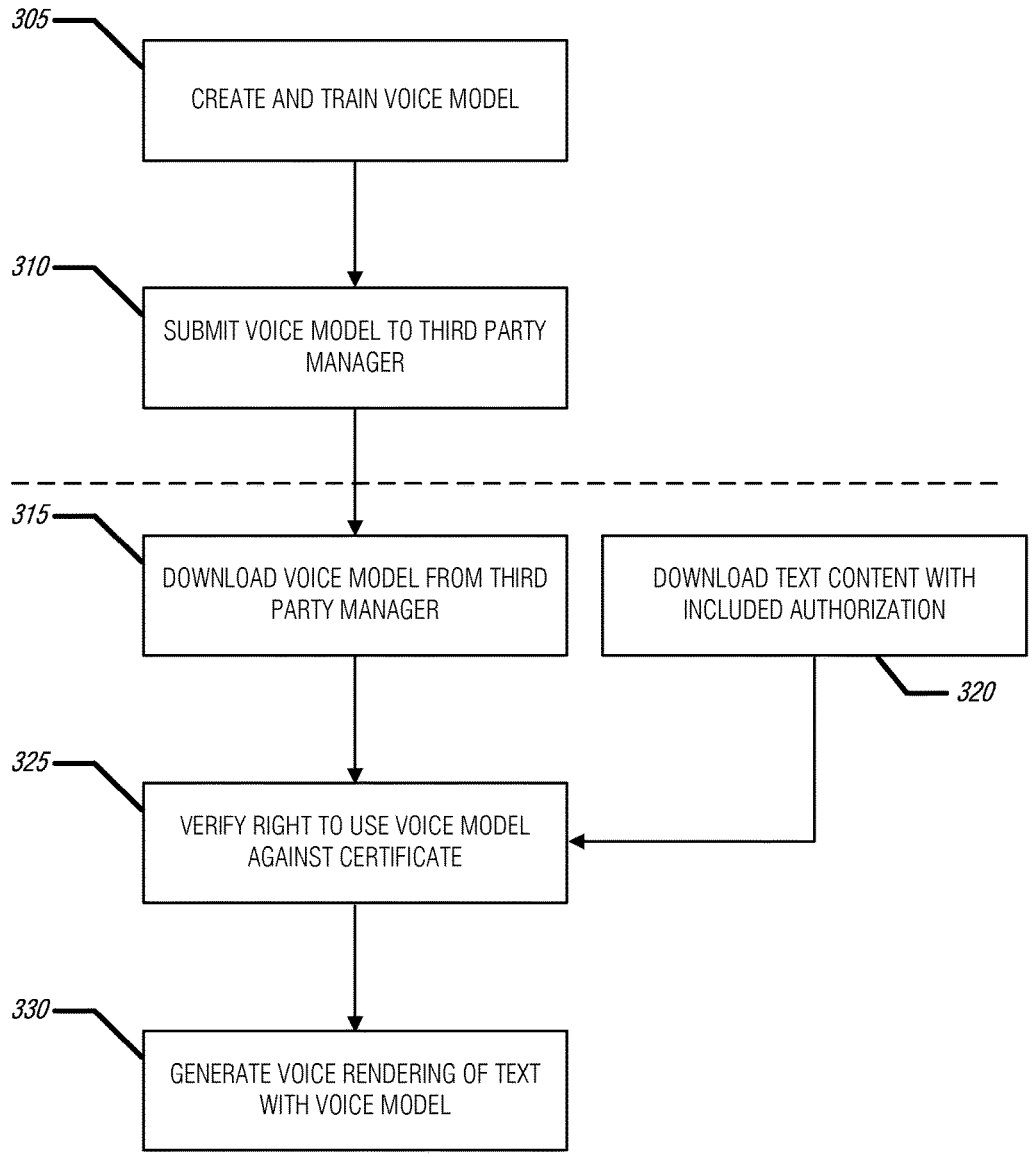
FIG. 3 illustrates a flow diagram of an example of a scenario for voice personalization for machine reading, according to an embodiment.

FIG. 3 illustrates a flow diagram of an example of a scenario 300 for voice personalization for machine reading. Any of the previously described components or operations may be used to implement the various elements of the scenario 300. As illustrated, the elements above the horizontal dashed line are performed by the sender (e.g., a machine under the sender's direction) and those below by the user/receiver (e.g., a machine under the user's direction).

At 305, the sender may create/train their voice model.

At 310, the sender may submit the created voice model to a third-party manager (e.g., a catalog or other service provider that allows access to voice models). The third-party manager may be responsible for authorizing use of voice models that it hosts. In an example, the sender may store and manage the voice model locally, for example, for peer-to-peer authorization or delivery.

At 315, the user device receives (e.g., downloads) the voice model. In an example, the user device is authorized prior to downloading the voice model. In an example, the user device may download (and cache) the voice model without authorization, but may not use the voice model without subsequent authorization.

At 320, the user device downloads a message with textual content. In an example, the message includes an authorization certificate. The authorization certificate may be generated based on a unique ID for the sender or an abstract (e.g., hash) of the message or the textual content.

At 325, the voice model verifies the authorization certificate.

At 330, if the authorization certificate is valid, the voice model synthesizes the sender's voice to audibly read the textual content to the user.

The scenario 300 is useful for non-session cases where a single message is transferred because it may avoid overhead intrinsic in maintaining state present in session-based models.

Figure 4:
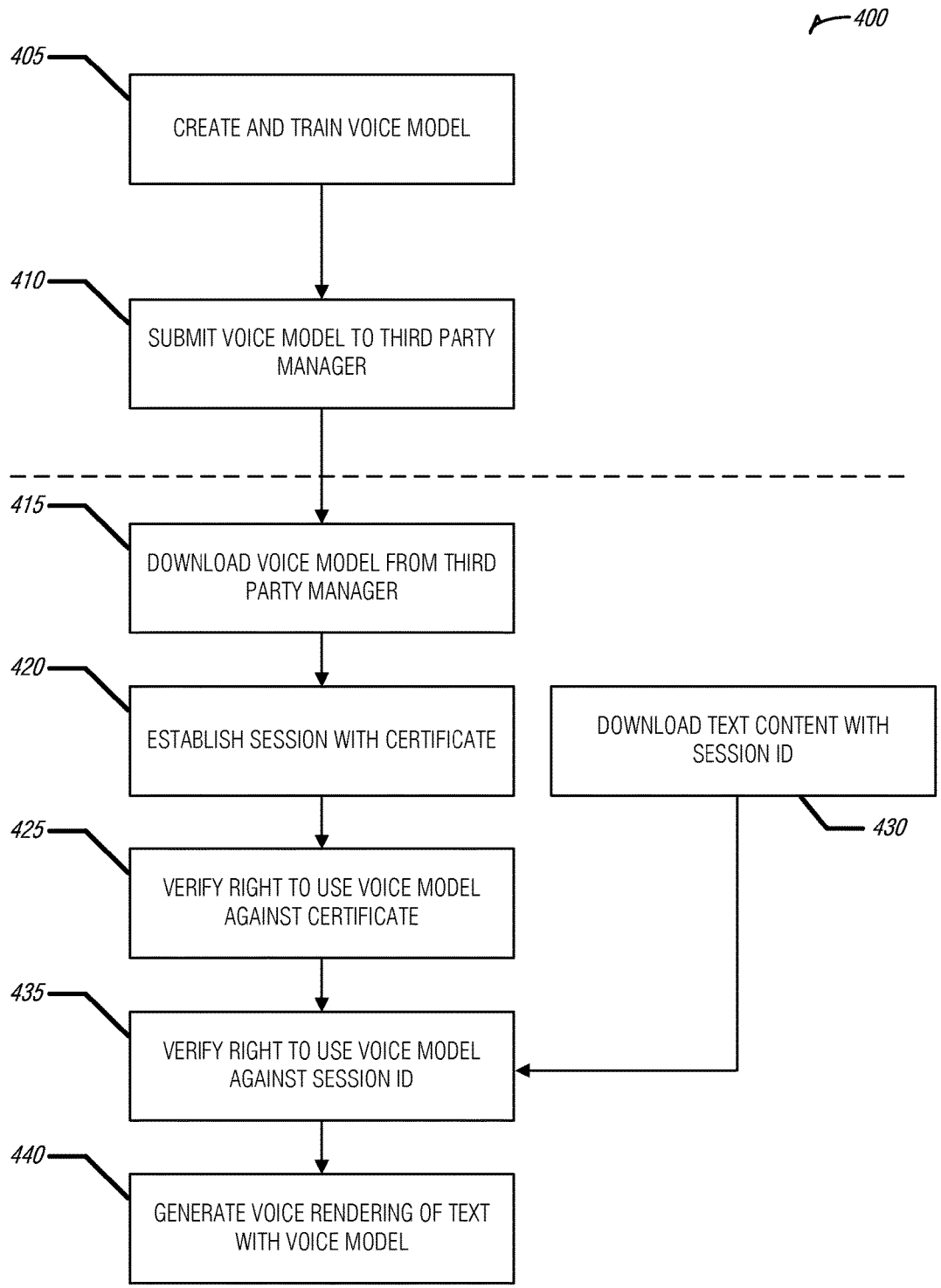
FIG. 4 illustrates a flow diagram of an example of a session-based scenario for voice personalization for machine reading, according to an embodiment.

FIG. 4 illustrates a flow diagram of an example of a session-based scenario 400 for voice personalization for machine reading. Any of the previously described components or operations may be used to implement the various elements of the scenario 400. As illustrated, the elements above the horizontal dashed line are performed by the sender (e.g., a machine under the sender's direction) and those below by the user (e.g., a machine under the user's direction). As noted above, with respect to FIGS. 1 and 2, a session-based model provides conditions in which a plurality of messages may be authorized with a single authorization. This scenario 400 presents one example of such conditions.

At 405, the sender may create/train their voice model.

At 410, the sender may submit the created voice model to a third-party manager (e.g., a catalog or other service provider that allows access to voice models). The third-party manager may be responsible for authorizing use of voice models that it hosts. In an example, the sender may store and manage the voice model locally, for example, for peer-to-peer authorization or delivery.

At 415, the user device downloads the voice model. In an example, the user device is authorized prior to downloading the voice model. In an example, the user device may download (and cache) the voice model without authorization, but may not use the voice model without subsequent authorization.

At 420, the user device may establish a session. In an example, the user device may be assigned a certificate (e.g., from an instant message service or application upon the opening of a thread) as part of establishing the session. The certificate may be assigned to a session ID.

At 425, in an example, the voice model may validate the certificate.

At 430, one or more messages may be downloaded by the user device. The messages may include a session ID without further identifying information.

At 435, the voice model, after having validated the certificate, may verify the right to use the voice model for a given downloaded message by checking that the session ID of the message matches the session ID of the certificate.

At 440, after verifying that the session ID of the message matches that of the certificate, the voice model synthesizes the sender's voice to audibly read the textual content to the user.

The session-based model involves some additional state overhead (e.g., establishing a session) but is more efficient when multiple message are expected and may be grouped together by avoiding the additional data in individually authorized messages as well as possibly computationally expensive operations with cryptographic authorization.

Figure 5:
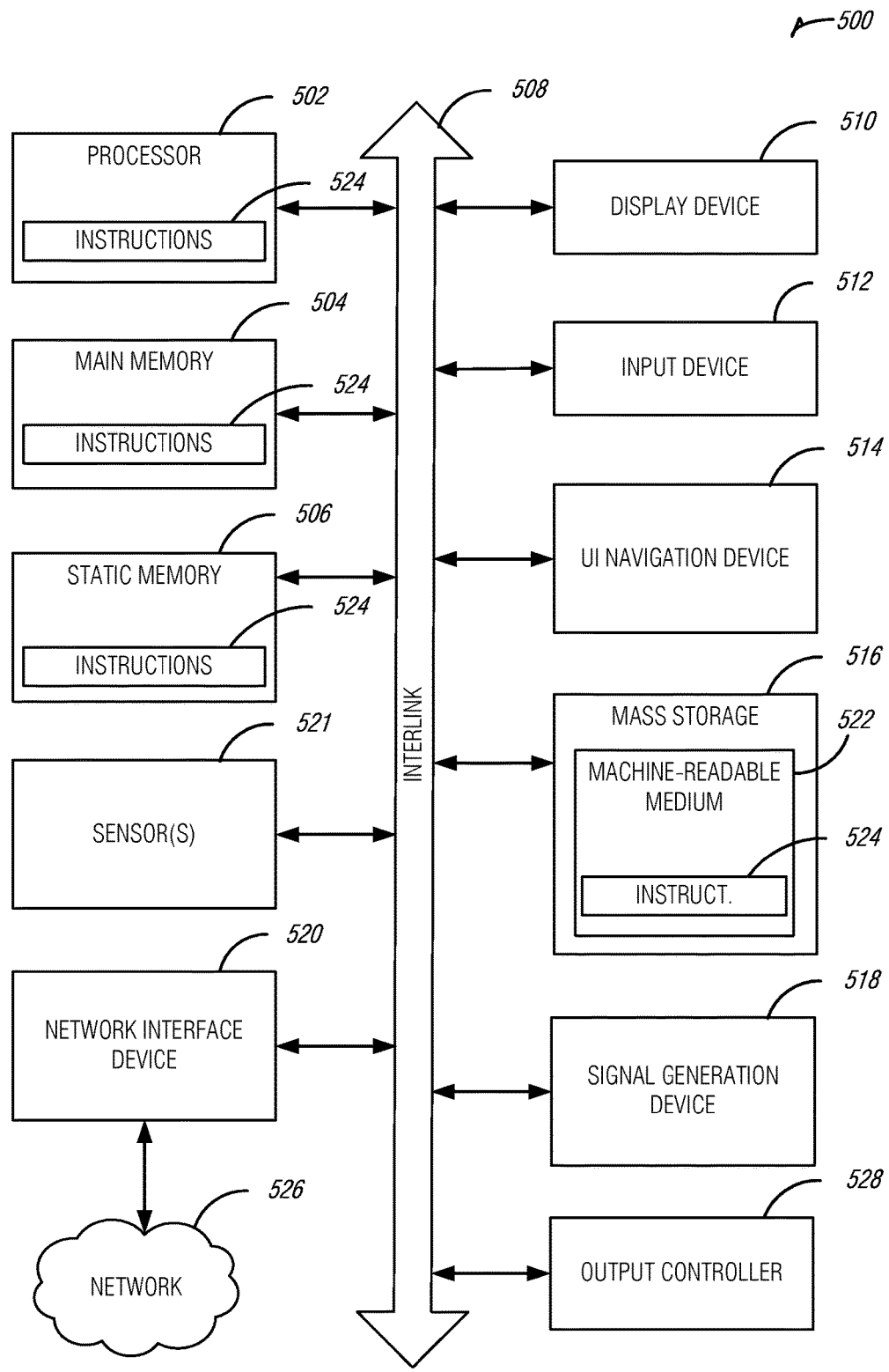
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS)

sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a device, apparatus, or a system of voice personalization for machine reading, the system comprising: a message module to receive a message with textual content; a sender identification module to identify a sender of the message; a voice model module to identify a voice model corresponding to the sender; and a render module to render an audio representation of the textual content using the voice model.

In Example 2, the subject matter of any one of Example 1 may optionally include, wherein to receive the message includes the message module to receive at least one of a short message service message, an instant message, or an email.

In Example 3, the subject matter of any one of Examples 1-2 may optionally include, wherein to receive the message includes the message module to receive an electronic document including the message, the message being a discrete and identifiable portion of the electronic document that corresponds to the sender.

In Example 4, the subject matter of any one of Examples 1-3 may optionally include, wherein the electronic document is a web page and the message is a posting displayed on the web page.

In Example 5, the subject matter of any one of Examples 1-4 may optionally include an authorization module to receive authorization to use the voice model; wherein to at least one of identify the sender or identify the voice model includes use of the authorization module; and wherein rendering the audio representation includes verifying that the voice model is authorized and not using the voice model otherwise.

In Example 6, the subject matter of any one of Examples 1-5 may optionally include, wherein to receive authorization to use the voice model includes the authorization module to acquire the authorization from the message, the authorization being embedded in the message.

In Example 7, the subject matter of any one of Examples 1-6 may optionally include, wherein to receive authorization to use the voice model includes the authorization module to acquire the authorization from a clearing house.

In Example 8, the subject matter of any one of Examples 1-7 may optionally include, wherein to receive authorization to use the voice model includes the authorization module to establish an authorization session, the authorization session providing authorization for a set of messages, the set of messages including the message.

In Example 9, the subject matter of any one of Examples 1-8 may optionally include, wherein the set of messages includes any messages received from the sender during a window of time.

In Example 10, the subject matter of any one of Examples 1-9 may optionally include, wherein the set of messages has a predetermined cardinality.

In Example 11, the subject matter of any one of Examples 1-10 may optionally include, wherein the message includes a session identification that corresponds to the session; and wherein to verify the authorization includes at least one of the render module or the authorization module to match the session identification to the session.

In Example 12, the subject matter of any one of Examples 1-11 may optionally include, wherein the authorization is provided via a digital rights management service.

In Example 13, the subject matter of any one of Examples 1-12 may optionally include, wherein the authorization includes a digital certificate.

In Example 14, the subject matter of any one of Examples 1-13 may optionally include: a creation module to create the voice model; and a catalog module to store the voice model.

In Example 15, the subject matter of any one of Examples 1-14 may optionally include, wherein to create the voice model includes the creation module to: present a script to a user; and capture voice samples from the user, the voice samples correlated to portions of the script.

In Example 16, the subject matter of any one of Examples 1-15 may optionally include, wherein to store the voice model includes the catalog module to store the voice model in a network accessible location.

Example 17 may include, or may optionally be combined with the subject matter of any one of Examples 1-16 to include, subject matter (such as a method, means for performing acts, or machine readable medium including instructions that, when performed by a machine cause the machine to performs acts) of voice personalization for machine reading, the method comprising: receiving a message with textual content; identifying a sender of the message; identifying a voice model corresponding to the sender; and rendering an audio representation of the textual content using the voice model.

In Example 18, the subject matter of any one of Example 17 may optionally include, wherein receiving the message includes receiving at least one of a short message service message, and instant message, or an email.

In Example 19, the subject matter of any one of Examples 17-18 may optionally include, wherein receiving the message includes receiving an electronic document including the message, the message being a discrete and identifiable portion of the electronic document that corresponds to the sender.

In Example 20, the subject matter of any one of Examples 17-19 may optionally include, wherein the electronic document is a web page and the message is a posting displayed on the web page.

In Example 21, the subject matter of any one of Examples 17-20 may optionally include, wherein at least one of identifying the sender or identifying the voice model includes receiving authorization to use the voice model; and
wherein rendering the audio representation includes verifying that the voice model is authorized and not using the voice model otherwise.

In Example 22, the subject matter of any one of Examples 17-21 may optionally include, wherein receiving authorization to use the voice model includes acquiring the authorization from the message, the authorization being embedded in the message.

In Example 23, the subject matter of any one of Examples 17-22 may optionally include, wherein receiving authorization to use the voice model includes acquiring the authorization from a clearing house.

In Example 24, the subject matter of any one of Examples 17-23 may optionally include, wherein receiving authorization includes establishing an authorization session, the authorization session providing authorization for a set of messages, the set of messages including the message.

In Example 25, the subject matter of any one of Examples 17-24 may optionally include, wherein the set of messages includes any messages received from the sender during a window of time.

In Example 26, the subject matter of any one of Examples 17-25 may optionally include, wherein the set of messages has a predetermined cardinality.

In Example 27, the subject matter of any one of Examples 17-26 may optionally include, wherein the message includes a session identification that corresponds to the session; and wherein verifying the authorization includes matching the session identification to the session.

In Example 28, the subject matter of any one of Examples 17-27 may optionally include, wherein the authorization is provided via a digital rights management service.

In Example 29, the subject matter of any one of Examples 17-28 may optionally include, wherein the authorization includes a digital certificate.

In Example 30, the subject matter of any one of Examples 17-29 may optionally include: creating the voice model; and storing the voice model.

In Example 31, the subject matter of any one of Examples 17-30 may optionally include, wherein creating the voice model includes: presenting a script to a user; and capturing voice samples from the user, the voice samples correlated to portions of the script.

In Example 32, the subject matter of any one of Examples 17-31 may optionally include, wherein storing the voice model includes storing the voice model in a network accessible location.

Example 33 may include, or may optionally be combined with the subject matter of any one of Examples 1-32 to include subject matter (such as a device, apparatus, or a system of voice personalization for machine reading) comprising: a receiving means to receive a message with textual content; an identification means to: identify a sender of the message; and identify a voice model corresponding to the sender; and a rendering means to render an audio representation of the textual content using the voice model.

In Example 34, the subject matter of any one of Example 33 may optionally include, wherein the message is at least one of a short message service message, an instant message, or an email.

In Example 35, the subject matter of any one of Examples 33-34 may optionally include, wherein to receive the message includes receiving an electronic document including the message, the message being a discrete and identifiable portion of the electronic document that corresponds to the sender.

In Example 36, the subject matter of any one of Examples 33-35 may optionally include, wherein the electronic document is a web page and the message is a posting displayed on the web page.

In Example 37, the subject matter of any one of Examples 33-36 may optionally including: an authorization means to receive authorization to use the voice model; wherein to at least one of identify the sender or identify the voice model includes to use the authorization means; and wherein to render the audio representation includes means to verify that the voice model is authorized and not using the voice model otherwise.

In Example 38, the subject matter of any one of Examples 33-37 may optionally include, wherein to receive authorization to use the voice model includes means to acquire the authorization from the message, the authorization being embedded in the message.

In Example 39, the subject matter of any one of Examples 33-38 may optionally include, wherein to receive authorization to use the voice model includes means to acquire the authorization from a clearing house.

In Example 40, the subject matter of any one of Examples 33-39 may optionally include, wherein to receive authorization includes means to establish an authorization session, the authorization session providing authorization for a set of messages, the set of messages including the message.

In Example 41, the subject matter of any one of Examples 33-40 may optionally include, wherein the set of messages includes any messages received from the sender during a window of time.

In Example 42, the subject matter of any one of Examples 33-41 may optionally include, wherein the set of messages has a predetermined cardinality.

In Example 43, the subject matter of any one of Examples 33-42 may optionally include, wherein the message includes a session identification that corresponds to the session; and wherein to verify the authorization includes means to match the session identification to the session.

In Example 44, the subject matter of any one of Examples 33-43 may optionally include, wherein the authorization is provided via a digital rights management service.

In Example 45, the subject matter of any one of Examples 33-44 may optionally include, wherein the authorization includes a digital certificate.

In Example 46, the subject matter of any one of Examples 33-45 may optionally include: creation means to create the voice model; and storing means to store the voice model.

In Example 47, the subject matter of any one of Examples 33-46 may optionally include, wherein to create the voice model includes: presentation means to present a script to a user; and capturing means to capture voice samples from the user, the voice samples correlated to portions of the script.

In Example 48, the subject matter of any one of Examples 33-47 may optionally include, wherein to store the voice model includes means to store the voice model in a network accessible location.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A non-transitory machine readable medium including instructions that, when executed by a machine, cause the machine to perform operations comprising:
   receiving a message with textual content;
   identifying a sender of the message;
   identifying a voice model corresponding to the sender; and
   rendering, to a user receiving the textual content, an audio representation of the textual content using the voice model, wherein at least one of identifying the sender or identifying the voice model includes receiving authorization to use the voice model, wherein the authorization specifies its validity for a limit defined by the sender and including at least one of:
   a window of time measured by units of days;
   a predetermined cardinality; or
   a message type; and
   wherein rendering the audio representation includes verifying that the voice model is authorized and not using the voice model otherwise.

2. The machine readable medium of claim 1, wherein receiving the message
   includes receiving at least one of a short message service message, and instant message, or an email.

3. The machine readable medium of claim 1, wherein receiving the message includes receiving an electronic document including the message, the message being a discrete and identifiable portion of the electronic document that corresponds to the sender.

4. The machine readable medium of claim 3, wherein the electronic document is a web page and the message is a posting displayed on the web page.

5. The machine readable medium of claim 1, wherein receiving authorization to use the voice model includes acquiring the authorization from a clearing house.

6. The machine readable medium of claim 1, wherein receiving authorization includes establishing an authorization session, the authorization session providing authorization for a set of messages, the set of messages including the message.

7. A system of voice personalization for machine reading, the system comprising:
  a message circuit to receive a message with textual content;
  a sender identification circuit to identify a sender of the message;
  a voice model circuit to identify a voice model corresponding to the sender;
  a render circuit to render, to a user receiving the message, an audio representation of the textual content using the voice model; and
  comprising an authorization circuit to receive authorization to use the voice model, wherein to at least one of identify the sender or identify the voice model includes use of the authorization circuit, wherein the authorization specifies its validity for a limit defined by the sender and including at least one of:
    a window of time measured by units of days;
    a predetermined cardinality; or
    a message type; and
  wherein, to render the audio representation, the render circuit verifies that the voice model is authorized and not using the voice model otherwise.

8. The system of claim 7, wherein to receive the message includes the message circuit to receive at least one of a short message service message, an instant message, or an email.

9. The system of claim 7, wherein to receive the message includes the message circuit to receive an electronic document including the message, the message being a discrete and identifiable portion of the electronic document that corresponds to the sender.

10. The system of claim 9, wherein the electronic document is a web page and the message is a posting displayed on the web page.

11. The system of claim 7, wherein to receive authorization to use the voice model includes the authorization circuit to acquire the authorization from the message, the authorization being embedded in the message.

12. A machine-implemented method of voice personalization for machine reading, the method comprising:
  receiving a message with textual content;
  identifying a sender of the message;
  identifying a voice model corresponding to the sender; and
  rendering, to a user receiving the textual content, an audio representation of the textual content using the voice model, wherein at least one of identifying the sender or identifying the voice model includes receiving authorization to use the voice model, wherein the authorization specifies its validity for a limit defined by the sender and including at least one of:
    a window of time measured by units of days;
    a predetermined cardinality; or
    a message type; and
  wherein rendering the audio representation includes verifying that the voice model is authorized and not using the voice model otherwise.

13. The method of claim 12, wherein receiving the message includes receiving at least one of a short message service message, and instant message, or an email.

14. The method of claim 12, wherein receiving the message includes receiving an electronic document including the message, the message being a discrete and identifiable portion of the electronic document that corresponds to the sender.

15. The method of claim 14, wherein the electronic document is a web page and the message is a posting displayed on the web page.

16. The method of claim 12, wherein receiving authorization to use the voice model includes acquiring the authorization from the message, the authorization being embedded in the message.

17. The machine readable medium of claim 1, wherein the voice model comprises phonemes, and wherein rendering the audio representation of the textual content includes performing a linguistic analysis of the textual content to determine phrasing, intonation, and duration of sounds to produce an utterance composed of the phonemes taken from the voice model.

18. The system of claim 7, wherein the voice model comprises phonemes, and wherein, to render the audio representation of the textual content, the render circuit performs a linguistic analysis of the textual content to determine phrasing, intonation, and duration of sounds to produce an utterance composed of the phonemes taken from the voice model.

19. The method of claim 12, wherein the voice model comprises phonemes, and wherein rendering the audio representation of the textual content includes performing a linguistic analysis of the textual content to determine phrasing, intonation, and duration of sounds to produce an utterance composed of the phonemes taken from the voice model.

* * * * *